(12) United States Patent
Murata

(10) Patent No.: US 7,974,095 B2
(45) Date of Patent: Jul. 5, 2011

(54) POWER SOURCE APPARATUS

(75) Inventor: Takashi Murata, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 59 days.

(21) Appl. No.: 12/514,340

(22) PCT Filed: Jun. 30, 2008

(86) PCT No.: PCT/JP2008/061829
§ 371 (c)(1),
(2), (4) Date: May 11, 2009

(87) PCT Pub. No.: WO2009/005030
PCT Pub. Date: Jan. 8, 2009

(65) Prior Publication Data
US 2010/0061061 A1 Mar. 11, 2010

(30) Foreign Application Priority Data
Jul. 5, 2007 (JP) ................................ 2007-177444

(51) Int. Cl.
H05K 7/20 (2006.01)
H01M 2/12 (2006.01)

(52) U.S. Cl. .......... 361/699; 361/688; 361/689; 429/62; 429/120; 165/80.4

(58) Field of Classification Search ........................ None
See application file for complete search history.

(56) References Cited

U.S. PATENT DOCUMENTS

| | | | | | |
|---|---|---|---|---|---|
| 5,141,826 | A | * | 8/1992 | Bohm et al. | 429/120 |
| 5,558,949 | A | * | 9/1996 | Iwatsuki et al. | 429/99 |
| 6,422,027 | B1 | * | 7/2002 | Coates et al. | 62/259.2 |
| 7,172,831 | B2 | * | 2/2007 | Jaura et al. | 429/72 |
| 7,217,473 | B2 | * | 5/2007 | Ovshinsky et al. | 429/62 |
| 7,218,489 | B2 | * | 5/2007 | Wilk et al. | 361/42 |
| 7,531,269 | B2 | * | 5/2009 | Wegner | 429/120 |
| 7,764,496 | B2 | * | 7/2010 | Nguyen et al. | 361/697 |
| 2008/0057382 | A1 | * | 3/2008 | Kimura | 429/120 |
| 2008/0280192 | A1 | * | 11/2008 | Drozdz et al. | 429/62 |
| 2008/0292948 | A1 | * | 11/2008 | Kumar et al. | 429/120 |
| 2009/0068552 | A1 | * | 3/2009 | Murata | 429/120 |
| 2009/0142654 | A1 | * | 6/2009 | Fakers et al. | 429/120 |
| 2010/0138064 | A1 | * | 6/2010 | Wilk et al. | 700/292 |

FOREIGN PATENT DOCUMENTS

| | | | |
|---|---|---|---|
| JP | 06-124733 | A | 5/1994 |
| JP | 11-135160 | A | 5/1999 |
| JP | 11-307139 | A | 11/1999 |
| JP | 2004306726 | * | 11/2004 |
| JP | 2005-19134 | A | 1/2005 |
| JP | 2007-095483 | A | 4/2007 |
| JP | 2008-204764 | A | 9/2008 |
| JP | 2010055832 | * | 3/2010 |

* cited by examiner

Primary Examiner — Boris L Chervinsky
(74) Attorney, Agent, or Firm — Kenyon & Kenyon LLP

(57) ABSTRACT

A power source apparatus includes a power source module which is formed of a plurality of power source elements, a case which houses the power source module and a cooling liquid, a fan which is placed in the case in a state in which the fan is immersed in the cooling liquid together with the power source module, the fan forming a laminar flow of the cooling liquid, the laminar flow having a width at least substantially the same as a length of the power source element in a length direction of the power source element.

12 Claims, 9 Drawing Sheets

POWER SOURCE APPARATUS

This is a 371 national phase application of PCT/JP2008/061829 filed 30 Jun. 2008, claiming priority to Japanese Patent Application No. 2007-177444 filed 5 Jul. 2007, the contents of which are incorporated herein by reference.

TECHNICAL FIELD

The present invention relates to a power source apparatus, and more particularly, to cooling control of the power source apparatus.

BACKGROUND ART

A power source element (power storage element) such as a battery cell and a capacitor within a power source apparatus generates heat during charge and discharge. A cooling apparatus (cooling mechanism) provided for the power source apparatus is used to cool the power source element to control the temperature of the whole power source apparatus, thereby achieving stabilization of the power source element, long life thereof, and stabilization of power supply.

Methods of cooling the power source apparatus (power source element) include gas cooling and liquid cooling. Heat from the power source element is transferred to a gas or liquid cooling medium, then transferred to a case which forms part of the power source apparatus, and dissipated to the outside of the power source apparatus. In the gas cooling, the cooling medium is easier to handle than that in the liquid cooling. However, the thermal conductivity of the cooling medium is lower than that in the liquid cooling. On the other hand, in the liquid cooling, the cooling medium is difficult to handle. For example, a sealing mechanism is required for preventing a leak of the cooling liquid from the power source apparatus. However, the liquid medium has a higher thermal conductivity than that of the gas medium to allow higher cooling efficiency.

In recent years, a power source apparatus such as a secondary battery and an electric double layer capacitor (condenser) is used as a battery of a hybrid car or an electric car. For saving space, a plurality of power source elements are placed at a high density to provide a higher power output. The liquid cooling with the high thermal conductivity is often employed in order to dissipate heat within the densely placed power source elements efficiently from the outer periphery thereof.

In a power source apparatus cooled through the liquid cooling, a cooling liquid is filled into a lower case which forms part of the power source apparatus, a plurality of power source elements are placed in the lower case filled with the cooling liquid, and an upper case (lid member) is put to seal the case containing the cooling liquid and a power source module formed of the plurality of power source elements. When the power source element generates heat due to charge/discharge, the generated heat is transferred to the cooling liquid, then to the case from the cooling liquid, and is finally dissipated to the outside of the power source apparatus. During the process, the cooling liquid is convected (naturally convected) within the sealed case in the same manner as gas. The action of the convection and the thermal conductivity of the cooling liquid itself cause the heat to be dissipated from the power source apparatus to the outside.

As described above, the thermal conductivity and the convection of the liquid are major contributors to the cooling efficiency in the liquid cooling. Patent Document 1 has proposed a technique to stir a coolant with a stirrer for the purpose of improving the cooling efficiency.

[Patent Document 1] Japanese Patent Laid-Open No. 6 (1994)-124733 (paragraph 0016, FIG. 3 and the like)

DISCLOSURE OF THE INVENTION

Problems to be Solved by the Invention

The power source module formed of the plurality of power source elements has the problem in which variations in performance between the power source elements lead to a reduction in life of the power source apparatus as a whole. Specifically, if the temperature of the cooling liquid in contact with the power source elements varies, the cooling liquid has a significant cooling effect on some of the plurality of power source elements but a slight cooling effect on others to result in variations in deterioration rate between the power source elements. Consequently, the power source apparatus has the problem of a reduction in life.

The variations in temperature of the cooling liquid in contact with the power source elements can be reduced by stirring the cooling liquid with the stirrer as in Patent Document 1 mentioned above. In the power source module formed of the densely placed power source elements as described above, however, it is difficult to prevent variations in temperature of the cooling liquid for all of the plurality of power source elements by partially stirring the cooling liquid as shown in Patent Document 1.

Particularly, each of cylindrical power source elements or rectangular power source elements, for example, is formed in a long shape and has a predetermined length for convenience of manufacture and for ensuring performance. If the cooling liquid has a significant cooling effect on part of the power source element in the length direction but a slight cooling effect on another part similarly to the abovementioned case, the difference in the cooling effect promotes deterioration of the performance of the power source element itself (because variations occur in the internal resistance of the power source element to promote performance deterioration thereof). Thus, the uneven distribution of temperature of the cooling liquid in contact in each of the power source elements in the length direction results in a reduction in life of the power source apparatus.

It is contemplated, as another solution, that a circulating mechanism is provided for forcedly circulating the cooling liquid (for circulation in which the cooling liquid is forcedly flowed through an inlet port into the battery apparatus by a pump or the like and is forcedly discharged through an outlet port) to prevent variations in temperature of the cooling liquid which acts on the plurality of power source elements. The circulating mechanism, however, has the problems of space which should be ensured for installation, a measure against a liquid leak (seal), piping, and an increased number of parts such as the circulating pump, so that this approach is not preferable in view of efficient use of space for installation, cost, manufacture and the like.

Even when the cooling liquid is forcedly flowed into the battery apparatus through the inlet port by the pump or the like and is discharged through the outlet port, the cooling liquid does not flow uniformly throughout the power source module. For example, the cooling liquid does not flow uniformly in the length direction of the power source module. In addition, the temperature of part of the cooling liquid in contact with the inner power source element within the power source module is different from the temperature of part of the cooling liquid in contact with the power source element placed in the peripheral portion of the power source module, so that the respective power source elements cannot be cooled appropriately. This shortens the life of the power source apparatus as described above to prevent the power source apparatus from achieving stable performance.

It is thus an object of the present invention to provide a power source apparatus in which variations in temperature of a cooling liquid can be prevented to cool a power source module including a plurality of power source elements preferably with a simplified structure.

Means for Solving Problems

According to an aspect of the present invention, a power source apparatus comprises a power source module which is formed of a plurality of power source elements, a case which houses the power source module and a cooling liquid and a fan which is placed in the case in a state in which the fan is immersed in the cooling liquid together with the power source module, the fan forming a laminar flow of the cooling liquid, the laminar flow having a width at least substantially the same as a length of the power source element in a length direction of the power source element.

The plurality of power source elements are arranged in parallel in a direction in which the laminar flow flows.

The fan forms the laminar flow which flows in a direction substantially perpendicular to the length direction of the power source element.

The fan forms the laminar flow as a first flow between the power source module and the case, and a second flow branches from the laminar flow formed by the fan and flows between the power source elements arranged in parallel in the flow direction of the laminar flow.

The power source module includes a pair of endplates which supports both terminals of each of the power source elements, and wherein the fan is provided for the end plates.

The power source module is placed such that a distance from an inner wall of the case to the power source module is larger than a distance between the adjacent ones of the power source elements arranged in parallel in the flow direction of the laminar flow.

The case is provided with a flow directing portion for directing at least part of the laminar flow of the cooling liquid between the power source elements.

The flow directing portion is formed to have a protruding shape which protrudes in a direction substantially perpendicular to the flow direction of the laminar flow from the inner wall of the case, and a peak of the protruding shape is placed between the power source elements and is formed to have a long shape extending in the length direction of the power source element.

A height of the protruding shape in the flow directing portion is changed depending on the number of the power source elements arranged in parallel in the flow direction of the laminar flow.

The power source apparatus further comprises a first plate member for directing the cooling liquid flowing out of the fan to space between the power source module and the case, and a second plate member for directing the cooling liquid directed to the space between the power source module and the case to an inlet side of the fan.

The fan is a cross flow fan.

EFFECTS OF THE INVENTION

According to the present invention, since the laminar flow of the cooling liquid that has at least substantially the same width as the length of the power source elements flows within the case, it is possible to prevent variations in temperature of the cooling liquid for the power source module including the plurality of power source elements preferably.

In addition, since the fan forming the laminar flow is placed in the case such that the fan is immersed in the cooling liquid together with the power source module, it is possible to prevent variations in temperature of the cooling liquid preferably with a simplified structure.

BEST MODE FOR CARRYING OUT THE INVENTION

Preferred embodiments of the present invention will hereinafter be described.

Embodiment 1

Figure 1:
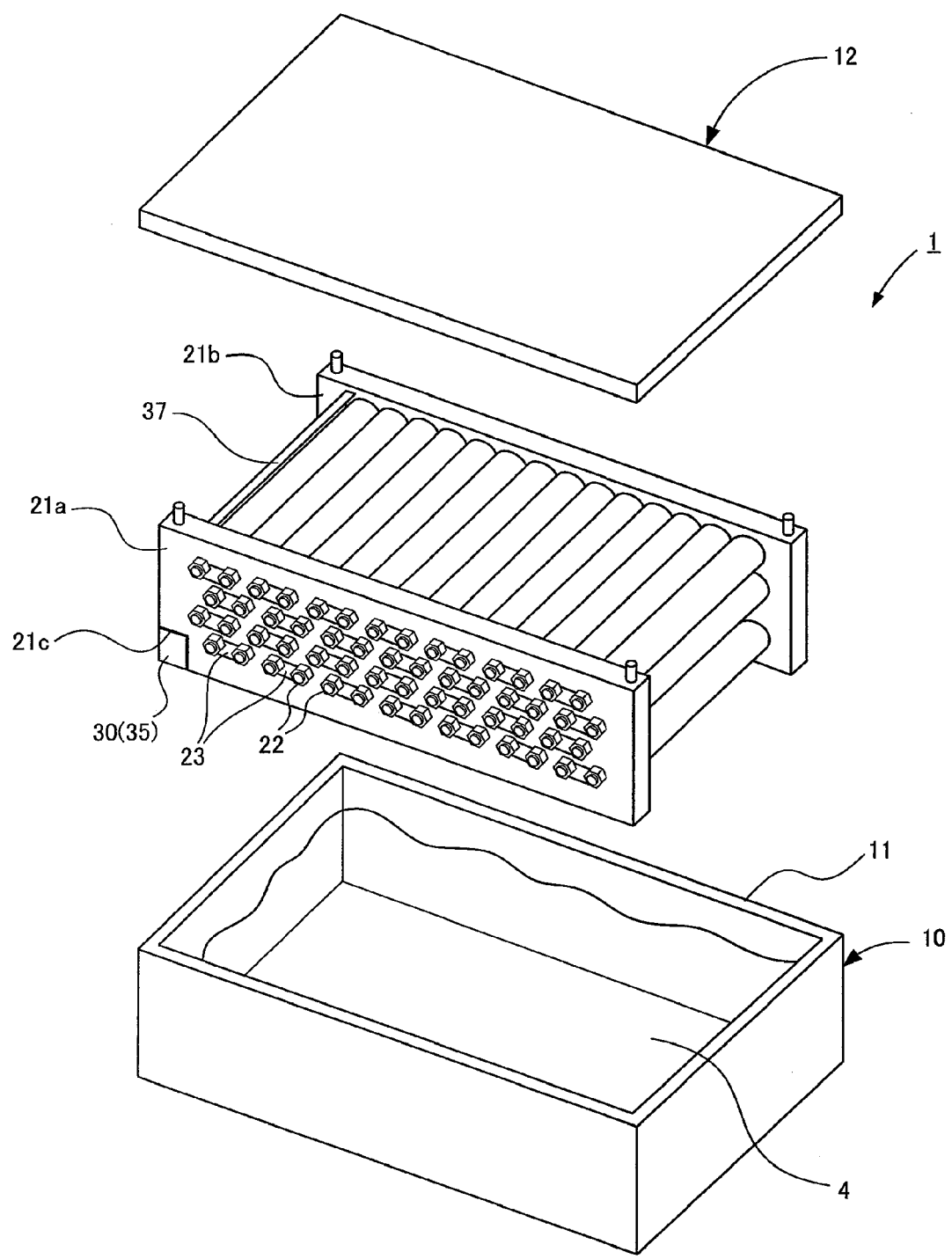
FIG. 1 An exploded perspective view showing a power source apparatus in Embodiment 1 of the present invention.
Figure 2:
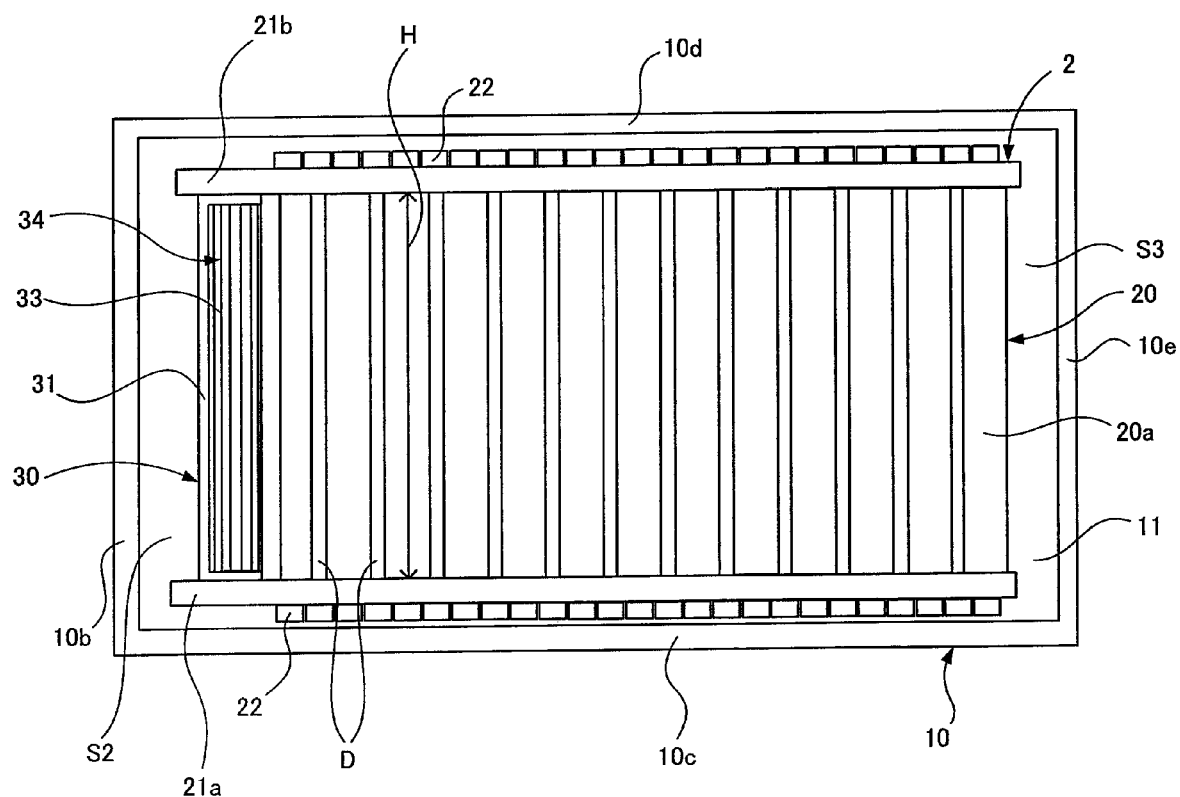
FIG. 2 A top view showing the power source apparatus in Embodiment 1 of the present invention.
Figure 3:
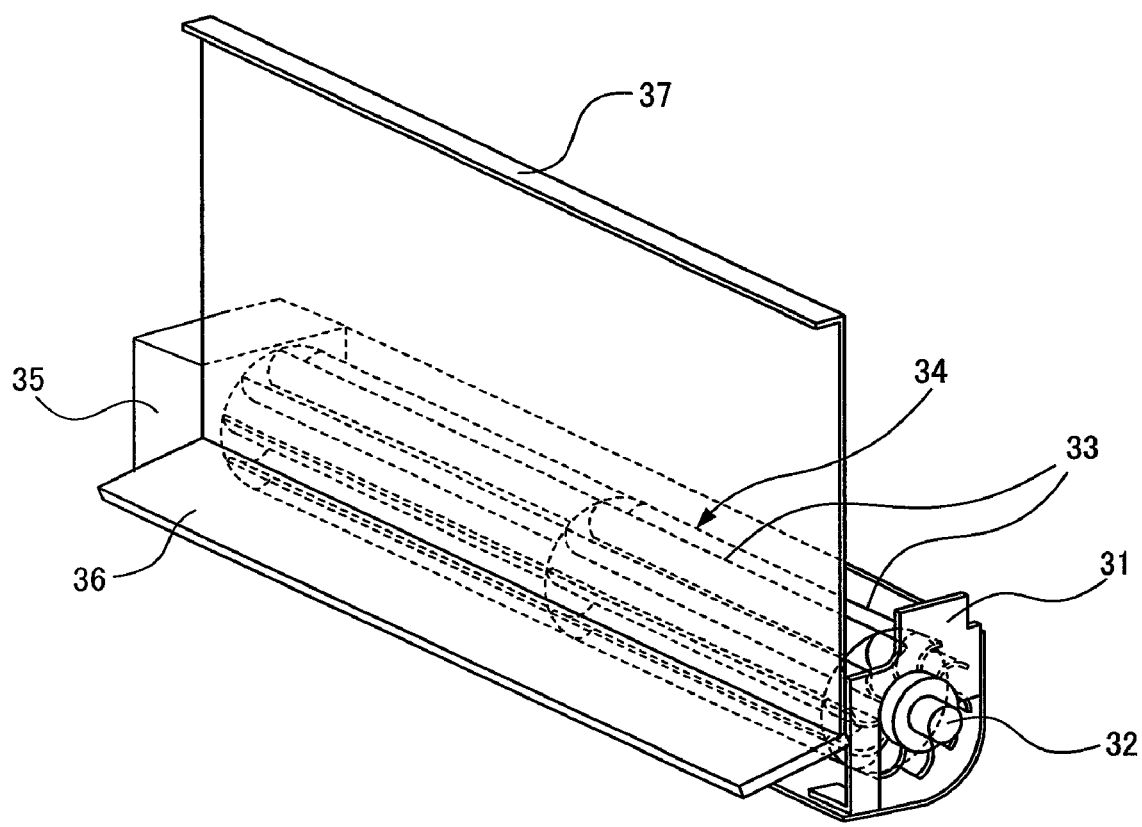
FIG. 3 A schematic diagram showing the outer appearance of a cross flow fan in Embodiment 1 of the present invention.
Figure 4:
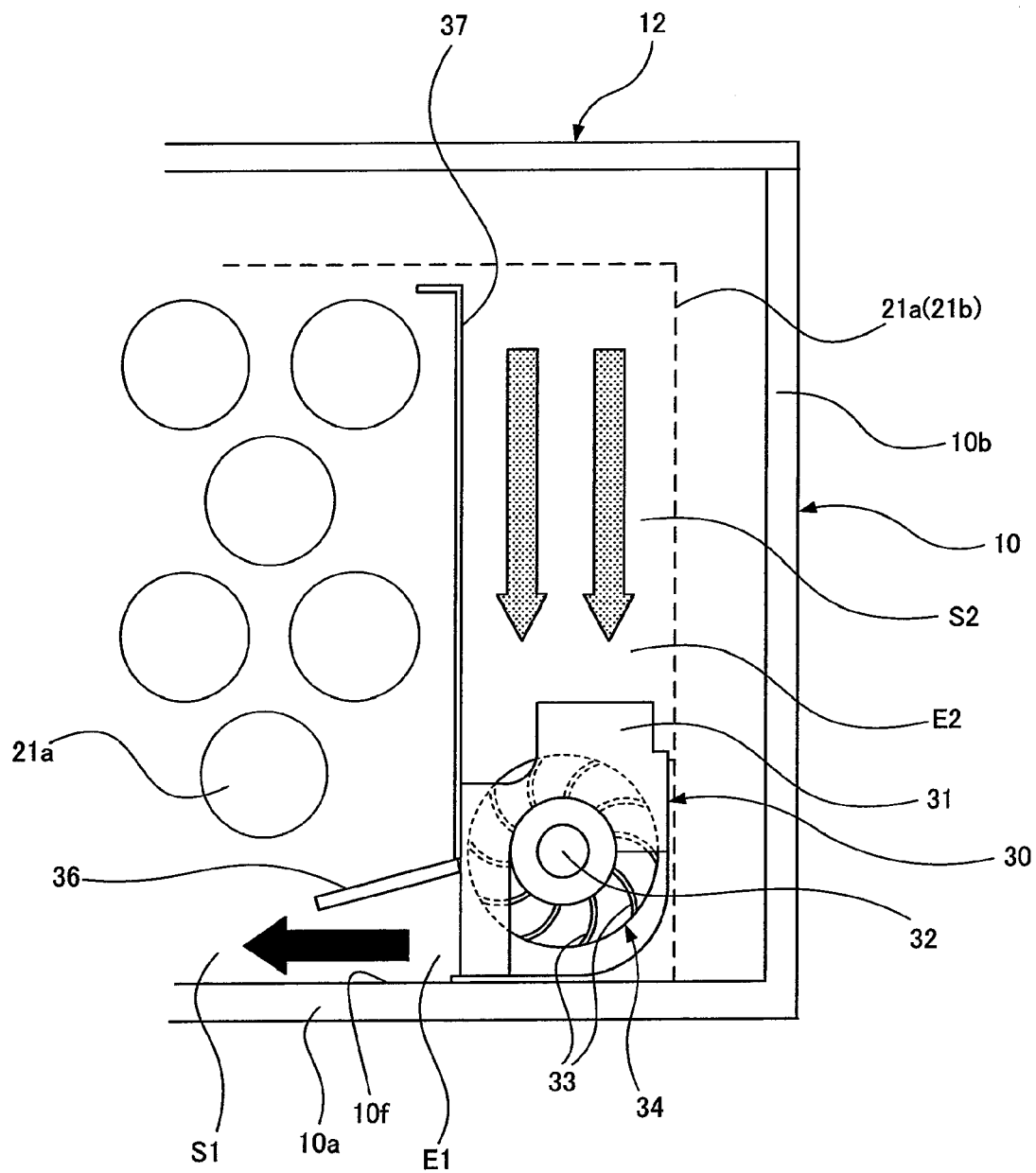
FIG. 4 A side view showing the cross flow fan in Embodiment 1 of the present invention.

A power source apparatus in Embodiment 1 of the present invention will be described with reference to FIGS. 1 to 4. FIG. 1 is an exploded perspective view showing a power source apparatus 1 of Embodiment 1. FIG. 2 is a top view showing the power source apparatus 1 of Embodiment 1. FIG. 3 is a schematic diagram showing the outer appearance of a cross flow fan which forms a laminar flow in the power source apparatus 1 of Embodiment 1. FIG. 4 is a side view showing the cross flow fan of the power source apparatus 1.

The power source apparatus 1 of Embodiment 1 is formed of a battery unit 2 which serves as a power source module, later described, and a case member which includes a lower case 10 having an opening portion 11 and putting the battery unit 2 in and an upper case 12 covering the opening portion 11 of the lower case 10. The lower case 10 and the upper case 12 provide sealed space for housing the battery unit 2. The sealed space is filled with a cooling liquid 4 for use in cooling the battery unit 2. The battery unit 2 of Embodiment 1 is immersed in the cooling liquid 4. The power source apparatus 1 is filled to capacity with the cooling liquid 4 of Embodiment 1 such that the cooling liquid 4 is in contact with the upper case 12, specifically with the upper inner wall of the case member. The power source apparatus 1 of Embodiment 1 is fixed to a body floor F of a vehicle to be installed in the vehicle.

A plurality of heat-radiating fins (not shown) for improving heat radiation of the case member (in other words, the battery unit 2) may be formed on the outer surfaces of the lower case 10 and the upper case 12.

The lower case 10 and the upper case 12 constituting the case member can be made of a material which has excellent heat transfer, corrosion resistance and the like. For example, it is possible to use a material having a thermal conductivity equal to or higher than that of the cooling liquid 4, later described. Specifically, the case member can be formed of metal (such as copper or iron).

An insulating oil or an inert liquid can be used as the cooling liquid 4. An example of the insulating oil is silicone oil. As the inert liquid, it is possible to use Fluorinert, Novec HFE (hydrofluoroether), and Novec1230 (manufactured by 3M) which are fluorine-containing inert liquids.

The battery unit 2 includes an assembled battery 20 which is formed of a plurality of cells (power source elements) 20a arranged in columns in parallel at predetermined intervals (interval D), a pair of end plates 21a and 21b which sandwich the assembled battery 20 at both ends to support both terminals of each of the cells 20a, and a cross flow fan 30, later described. The cells 20a (the terminals thereof) constituting the assembled battery 20 are electrically connected in series or in parallel through a bus bar 23. Wires (not shown) for a positive electrode and a negative electrode are connected to the assembled battery 20. The wires extend through the case member and are connected to an electronic device (for example, a motor) placed outside the case member.

In Embodiment 1, a cylindrical secondary battery having a predetermined length is used as the cell 20a. Examples of the secondary battery include a nickel metal hydride (NiMH) battery, a lithium-ion battery and the like. The shape of the cell 20a is not limited to the cylinder, and other forms such as a square may be used. While the secondary battery is used in Embodiment 1, an electric double layer capacitor (condenser) or a fuel cell may be used instead of the secondary battery. The secondary battery and the others mentioned serve as the power source of the electronic device described above.

As shown in FIG. 3, the cross flow fan 30 of Embodiment 1 includes a body member 31 which has a length (width) substantially the same as a length H of the cells 20a in the length direction of the cells 20a arranged in parallel (or a distance between the paired end plates 21a and 21b), a fan member 34 which has a plurality of blade portions 33 having a predetermined curvature and provided radially in the circumferential direction of a rotation axis 32 extended in the length direction of the cells 20a and provided rotatably for the body member 31, and a motor 35 which is connected to the rotation axis 32 to rotate and drive the fan member 34. As shown in FIG. 1, the motor 35 is placed in a motor placement portion 21c formed by partially cutting the end plate 21a and does not protrude into the space between the end plate 21a and the lower case 10 (see FIG. 2). The motor 35 is connected to a wire (not shown) connected to a power supply portion (such as a battery) provided outside the power source apparatus 1, and the wire extends through the case member to the outside of the case member.

The cross flow fan 30 of Embodiment 1 is provided for the end plates 21a and 21b forming part of the battery unit 2 and is placed between the end plates 21a and 21b. Specifically, the cross flow fan 30 is disposed such that the rotation axis 32 and the blade portions 33 of the fan member 34 are perpendicular to the end plates 21a and 21b (see FIG. 2). The rotation axis 32 and the blade portions 33 are formed to have substantially the same lengths as the length H of the cells 20a. The cross flow fan 30 can be attached to the end plates 21a and 21b with various methods such as engagement and bonding with an adhesive.

As shown in FIG. 4, the cross flow fan 30 of Embodiment 1 is placed in a lower corner portion of the end plates 21a and 21b, that is, at an end portion of the end plate closer to a bottom portion 10a of the lower case 10 such that the fan 30 is aligned parallel with the cells 20a arranged in parallel and is disposed between the end plates 21a and 21b (see FIG. 2). In the cross flow fan 30 of Embodiment 1, an inlet side (inlet port) E2 through which the cooling liquid 4 flows into the fan member 34 is perpendicular to a vertical direction of the power source apparatus 1 (battery unit 2), and an outlet side (outlet port) E1 through which the cooling liquid 4 flows out of the fan member 34 is perpendicular to a horizontal direction of the power source apparatus 1 (battery unit 2).

More specifically, the outlet side E1 is perpendicular to the direction in which the plurality of cells 20a are arranged in parallel, and faces (is located in) space S1 between the bottom portion 10a of the lower case 10 and the cell 20a placed in the lowermost layer within the battery unit 2 of the plurality of cells 20a arranged in parallel. The inlet side E2 faces space S2 between a side portion 10b of the lower case 10 and the assembled battery 20 such that the cooling liquid 4 flows into the fan member 34 in the vertical direction of the power source apparatus 1.

In Embodiment 1, to form the outlet side E1 and the inlet side E2 in the cross flow fan 30, a first plate member 36 and a second plate member 37 are provided between the inlet side E2 through which the cooling liquid 4 flows into the fan member 34 and the outlet side E1 through which the cooling liquid 4 flows out of the fan member 34.

Specifically, the first plate member 36 is placed from the fan member 34 toward the space S1 between the bottom portion 10a of the lower case 10 and the cell 20a located in the lowermost layer within the battery unit 2 of the plurality of cells 20a arranged in parallel, and the second plate member 37 is provided in the vertical direction of the battery unit 2 from the fan member 34. While each of the first and second plate members 36 and 37 of Embodiment 1 is formed separately from the cross flow fan 30 and is attached to the body member 31, they may be formed integrally with the body member 31.

The first and second plate members 36 and 37 are provided between the end plates 21a and 21b similarly to the cross flow fan 30. Each of the members 36 and 37 has a length (width) substantially the same as the length H of the cells 20a in the length direction of the cells 20a arranged in parallel (or the distance between the paired end plates 21a and 21b). The first plate member 36 extends in the area from the body member 31 to the cell 20a placed closest to the crow flow fan 30 and in the lowermost layer within the battery unit 2 of the plurality of cells 20a arranged in parallel. The second plate member 37 extends in the area from the body member 31 to the cell 20a placed closer to the cross flow fan 30 and in the uppermost layer within the battery unit 2 of the plurality of cells 20a arranged in parallel.

FIG. 2 shows the battery unit 2 housed in the lower case 10 of the power source apparatus 1. As shown in FIG. 2, the space between the end plate 21a or the end plate 21b and the side wall 10c or 10d of the lower case 10 (the space where the terminals 22 and the bus bar 23 are placed) is not formed as space where the cooling liquid 4 flows, and the cross flow fan 30 and the second plate member 37 are placed between the plurality of cells 20a and the side wall 10b of the lower case 10. In the power source apparatus 1 of Embodiment 1 configured in this manner, the cross flow fan 30 causes the cooling liquid 4 to form a laminar flow which flows around the battery unit 2 along the direction in which the plurality of cells 20a are arranged in parallel, as later described.

Figure 5:
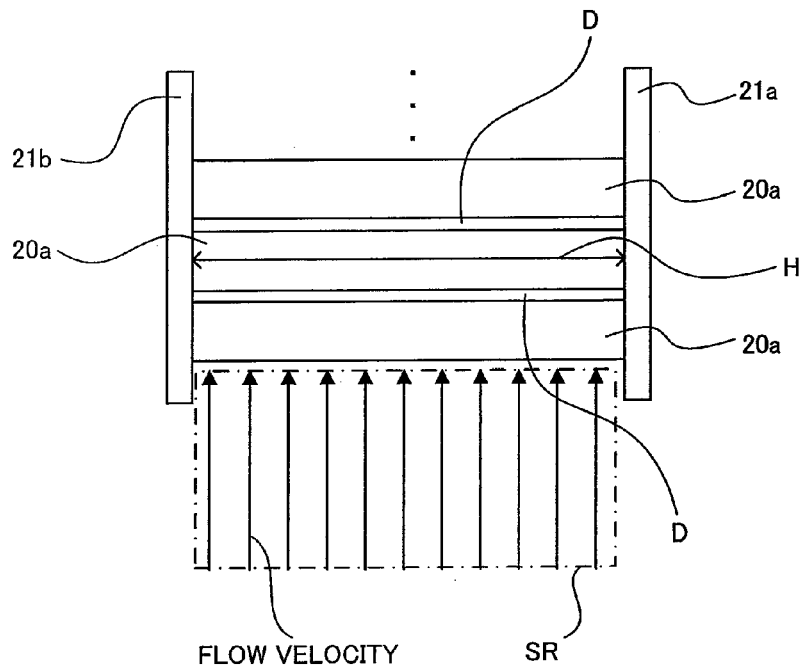
FIG. 5 A diagram for explaining the relationship between a laminar flow of a cooling liquid formed by the cross flow fan and power source elements in Embodiment 1 of the present invention.

The cross flow fan 30 of Embodiment 1 is immersed in the cooling liquid 4 and is placed within the lower case 10 together with the battery unit 2 as described above. The fan member 34 forms a laminar flow SR of the cooling liquid 4 that has at least substantially the same width as the length H of the cells 20a in the length direction thereof. Specifically, the cross flow fan 30 of Embodiment 1 is placed between the end plates 21a and 21b in parallel with the plurality of cells 20a arranged in parallel such that the outlet side E1 of the cross flow fan 30 is perpendicular to the direction in which the plurality of cells 20 are arranged in parallel. Thus, as shown in FIG. 5, the laminar flow SR is formed such that the cooling liquid 4 flows in the direction substantially perpendicular to the length direction of the plurality of cells 20 of the battery unit 2 and that the cooling liquid 4 has uniform distribution of the same flow velocity in a section substantially perpendicular to the length direction of the cells 20a (vertical direction of the power source apparatus 1). The lengths of arrows shown in FIG. 5 represent the flow velocity. The flow velocity distributes uniformly throughout the laminar flow SR in the length direction of the cells 20a.

The battery unit 2 of Embodiment 1 will be described in terms of the laminar flow SR formed by the cross flow fan 30. The plurality of cells 20a are arranged in line in the direction in which the laminar flow SR formed by the cross flow fan 30 flows. The cells 20a are placed such that the length direction of the cells 20a is substantially orthogonal to the direction in which the laminar flow SR flows (such that the interval D between the adjacent cells 20a in the length direction is substantially orthogonal to the direction in which the laminar flow SR flows).

Figure 6:
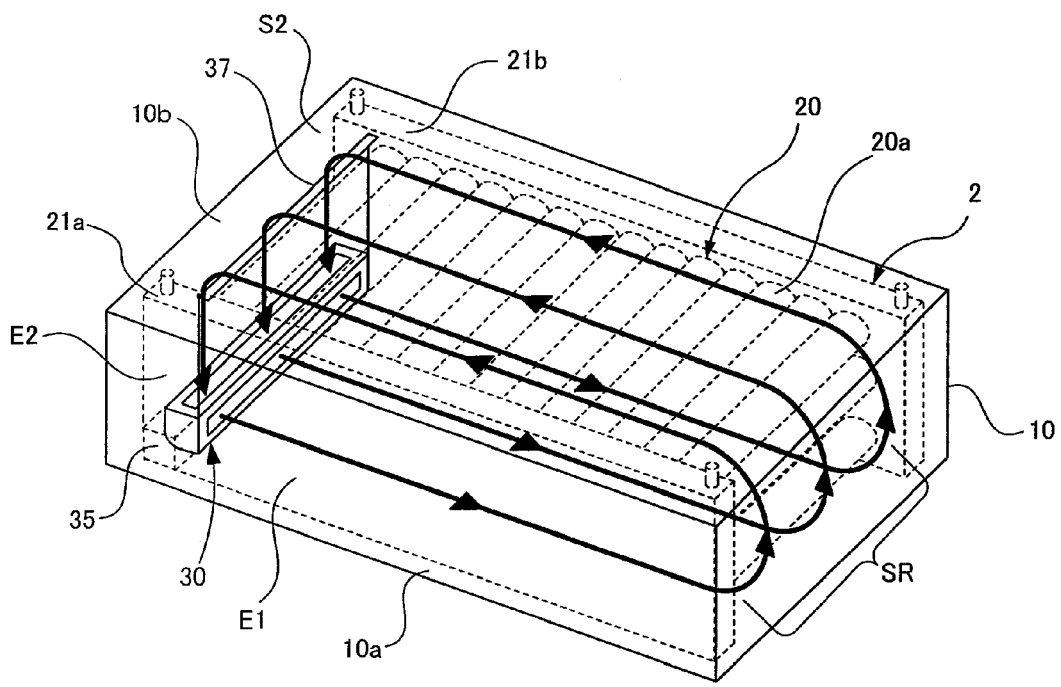
FIG. 6 A diagram for explaining the laminar flow of the cooling liquid formed by the cross flow fan in Embodiment 1 of the present invention.

FIG. 6 is a diagram for explaining the flow of the cooling liquid 4 in Embodiment 1 and shows the flow of the laminar flow SR of the cooling liquid 4 formed by the cross flow fan 30.

As described above, the fan member 34 has the plurality of blade portions 33 which extend in the length direction of the cells 20a, have the predetermined curvature, and are provided around the rotation axis 32 radially in the circumferential direction of the rotation axis 32. The cooling liquid 4 flows in through the inlet side E2 in response to the rotation of the fan member 34 and then forms the laminar flow SR which has the uniform flow velocity in the length direction of the cells 20a and flows through the outlet side E1 into the space S1 between the bottom portion 10a of the lower case 10 and the cell 20a located in the lowermost layer within the battery unit 2 of the plurality of cells 20a arranged in parallel.

The laminar flow SR, after flowing into the space 51 between the bottom portion 10a of the lower case 10 and the cell 20a located in the lowermost layer within the battery unit 2 of the plurality of cells 20a arranged in parallel, flows in the direction in which the plurality of cells are arranged in parallel. The laminar flow SR flows along the outer periphery of the battery unit 2, during which time the laminar flow SR exchanges heat with the cells 20a as later described. After the laminar flow SR flows over the battery unit 2, that is, through the space between the upper case 12 and the cell 20a located in the uppermost layer within the battery unit 2 of the plurality of cells 20a arranged in parallel, the laminar flow SR is directed by the second plate member 37 into the space S2 between the second plate member 37 and the side wall 10b of the lower case 10 and then flows toward the inlet side E2 of the cross flow fan 30.

In this manner, in Embodiment 1, the cross flow fan 30 forms the laminar flow SR which has substantially the same width as the length H of the cells 20a and flows around the assembled battery 20 between the end plates 21a and 21b. In other words, the laminar flow SR having substantially the same width as the length H of the plurality of cells 20a placed in parallel at a high density flows around the assembled battery 20 to prevent variations in temperature of the cooling liquid 4 in the length direction of each of the cells 20a and to prevent variations in temperature of the whole cooling liquid 4 in contact with the plurality of cells 20a. In the following, the flow of the cooling liquid 4 in the power source apparatus 1 of Embodiment 1 will be described with reference to FIG. 7, and more detailed description will be given of how to prevent temperature variations in each of the cells 20a and in the whole assembled battery 20 achieved by the flow of the cooling liquid 4.

Figure 7:
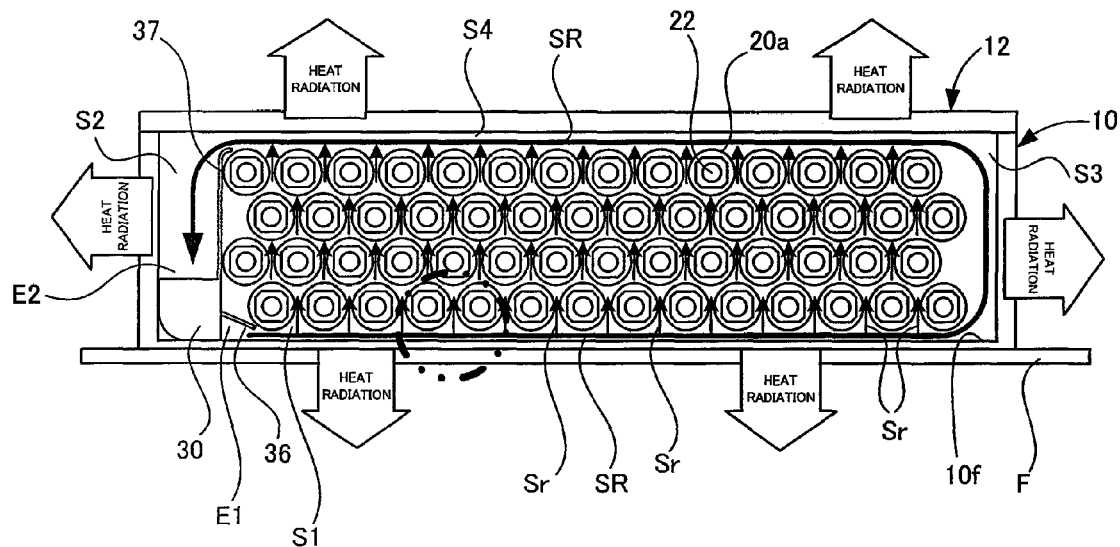
FIG. 7 A section view showing the power source apparatus in Embodiment 1 of the present invention to explain the flow of the cooling liquid.

As shown in FIG. 7, when the motor 35 of the cross flow fan 30 immersed in the cooling liquid 4 and placed within the lower case 10 is driven, the rotation axis 32 coupled to the motor 35 is rotated to cause rotation of the fan member 34 clockwise (see FIG. 3). This allows the plurality of blade potions 33 of the fan member 34 to form the laminar flow SR of the cooling liquid 4 which flows around the assembled battery 20 formed of the densely placed cells 20a.

Specifically, the cooling liquid 4 placed in the space S2 within the lower case 10 flows to the inlet side E2 in response to the driving of the fan member 34 and then flows into the fan member 34 (blade portions 33) of the cross flow fan 30 through the inlet side E2. The cooling liquid 4, after the flowing into the fan member 34 (blade portions 33), is subjected to the action of the blade portions 33 to form the laminar flow SR having substantially the same width as the length H of the cells 20a. The laminar flow SR flows out through the outlet side E1. The cooling liquid 4 as the laminar flow SR, after flowing out through the outlet side E1, is directed to the space S1 by the first plate member 36.

Then, the laminar flow SR flows in the direction in which the cells 20a are arranged from the outlet side E1 of the cross flow fan 30. The laminar flow SR moves through the space S1 between the bottom portion 10a of the lower case 10 and the cell 20a placed in the lowermost layer within the battery unit 2 of the plurality of cells 20a arranged in parallel, and exchanges heat with the plurality of cells 20a while the laminar flow SR is in contact with the cells 20a. Part of the laminar flow SR branches off and this branch laminar flow Sr flows in the interval D between the cells 20, that is, in the interval D formed between the adjacent cells 20a.

Thus, the two laminar flows are formed in Embodiment 1, that is, the main laminar flow SR (first flow) which flows around the assembled battery 20 between the assembled battery 20 (power source module) and the lower case 10 and the branch flow Sr (second flow) which branches from the main laminar flow and flows between the cells 20a arranged in parallel in the direction in which the laminar flow RS flows.

As described above, since the main laminar flow SR flows in the direction substantially perpendicular to the length direction of the cells 20a and has substantially the same width as the length H of the cells 20a, the branch laminar flow Sr branching from the main laminar flow SR also flows with substantially the same width as the length H of the cells 20a through the interval D between the cells 20a. The branch laminar flow Sr having the uniform flow velocity in the length direction of the cells 20a is in contact with the cells 20a and flows in the upward direction of the battery unit 2, during which time the flow Sr exchanges heat uniformly in the length direction. As a result, it is possible to prevent variations in temperature of the cooling liquid 4 in the length direction of each of the cells 20*a*.

As shown in FIG. 7, the cooling liquid 4, after flowing through the interval D between the cells 20*a* placed in the lowermost layer of the battery unit 2, comes into contact with the plurality of cells 20*a* arranged in parallel in the higher layers. The branch flow from the main laminar flow SR finally passes through the interval D between the cells 20*a* placed in the uppermost layer of the battery unit 2 and merges into the main laminar flow SR flowing along the outer periphery of the assembled battery 20.

After the main laminar flow SR flows from the cross flow fan 30 and flows through the space S1 between the bottom surface 10*a* of the lower case 10 and the cell 20*a* placed in the lowermost layer within the battery unit 2 of the plurality of cells 20*a* arranged in parallel, through space S3 between the battery unit 2 and a side wall 10*e* of the lower case 20, and through space S4 between the battery unit 2 and the upper case 12, the flow SR is guided by the second plate member 37 and flows into (return to) the space S2. The branch laminar flow Sr, after branching from the branch laminar flow Sr and flowing between the cells 20 within the assembled battery 20, is also guided by the second plate member 37 and flows into (return to) the space S2.

Figure 8:
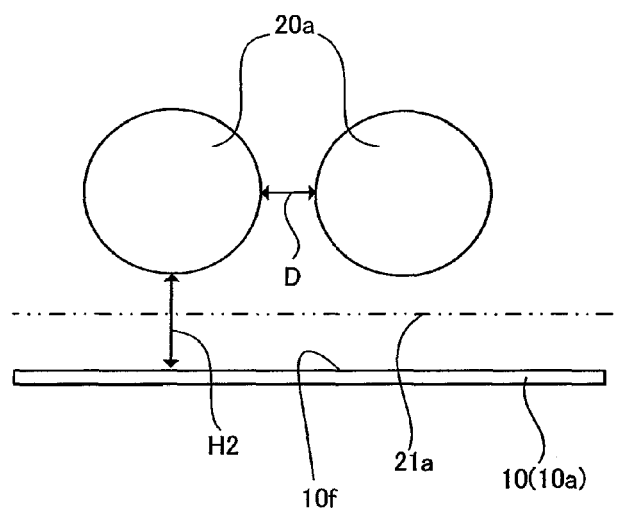
FIG. 8 A schematic diagram for explaining the layout of a battery unit in Embodiment 1 of the present invention.

In Embodiment 1, a condition is set for forming the branch laminar flow Sr flowing between the cells 20*a* within the assembled battery 20. As shown in FIG. 8, the battery unit 2 of Embodiment 1 is housed and placed in the lower case 10 such that H2 is larger than D (H2>D) where D represents the interval between the cells 20*a* arranged in parallel placed in the lowermost layer of the assembled battery 20 closer to the bottom portion 10*a* of the lower case 10 and H2 represents the distance from a bottom surface 10*f* of the lower case 10 to the plurality of cells 20*a* arranged in parallel placed in the lowermost layer.

In other words, the battery unit 2 is disposed such that the distance H2 from the bottom portion 10*a* (inner wall) of the lower case 10 to the cell 20*a* forming part of the battery unit 2 is larger than the distance D between the adjacent cells 20*a* arranged in parallel in the direction in which the laminar flow SR flows.

The placement of the battery unit 2 as described above reduces the opening area of the interval D between the cells 20*a* for letting in the flow of the cooling liquid 4. This prevents an increase in amount of the branch laminar flow Sr branching from the main laminar flow SR which would reduce the main laminar flow SR flowing along the outer periphery of the assembled battery 20. Specifically, if H2≦D, the flow of the cooling liquid 4 to the interval D between the cells 20*a* may be promoted, and the main laminar flow SR may be directed to the interval D between the cells 20*a* without flowing around the whole assembled battery 20. This may cause stagnation of the cooling liquid 4 within the case to hinder the prevention of variations in temperature of the cooling liquid 4.

To address this, Embodiment 1 provides the configuration in which the main laminar flow SR maintains substantially the same width as the length H of the cells 20*a* and is flowed along the peripheral surface of the assembled battery 20 to prevent variations in temperature of the respective cells 20*a* and the branch laminar flow Sr formed of the branching part of the main laminar flow SR is flowed through the interval D between the cells 20*a* by placing the battery unit 2 such that the distance H2 from the bottom portion 10*a* (inner wall) of the lower case 10 to the cell 20*a* forming part of the battery unit 2 is larger than the distance D between the adjacent cells 20*a* arranged in parallel in the flowing direction of the laminar flow SR.

In this manner, in the power source apparatus 1 of Embodiment 1, the laminar flow SR of the cooling liquid 4 that has at least substantially the same width as the length H of the cells 20 flows within the case, so that it is possible to prevent variations in temperature of the cooling liquid for the battery unit 2 including the plurality of cells 20*a*.

Particularly, in Embodiment 1, the laminar flow SR has substantially the same width as the length H of the cells 20*a* and circulates between the end plates 21*a* and 21*b*. This can avoid stagnation of the cooling liquid 4 in the battery unit 2 to prevent variations in temperature of the cooling liquid 4 preferably.

Since the cross flow fan 30 for forming the laminar flow SR is placed within the case such that the fan 30 is immersed in the cooling liquid 4 together with the battery unit 2, the sealing of the cooling liquid 4 can be improved as compared with the case where the external circulating mechanism is provided for the cooling liquid 4. In addition, since the heat generated by the motor 35 of the cross flow fan 30 in driving is radiated to the outside through the cooling liquid 4, the power source apparatus 1 can be provided with easy and inexpensive maintenance, low cost, easy and low-cost manufacture and the like.

The cross flow fan 30 of Embodiment 1 is placed on the end plates 21*a* and 21*b* between the end plates 21*a* and 21*b*, so that the components within the case can be arranged to use the space efficiently. The cross flow fan 30 is applicable readily to an existing power source apparatus. The number of parts can be reduced and the power source apparatus 1 can be reduced in size.

In Embodiment 1, the laminar flow SR has the uniform flow velocity distribution in the section substantially perpendicular to the length direction of the cells 20*a* (in the vertical direction of the power source apparatus 1). Thus, as compared with the conventional example in which the flow velocity varies in the section substantially perpendicular to the length direction of the cells 20*a* (in the vertical direction of the power source apparatus 1), detection of the temperature of the cooling liquid 4 (battery unit 2) can be facilitated. For example, detection of the temperature at two points of the space S1 and space S2 is sufficient. Specifically, if the flow velocity varies in the section substantially perpendicular to the length direction (in the vertical direction of the power source apparatus 1), the temperature distributes unevenly in the direction of that section and a number of temperature sensors are needed for detection. In Embodiment 1, however, two temperature sensors are sufficient.

Embodiment 2

Figure 9:
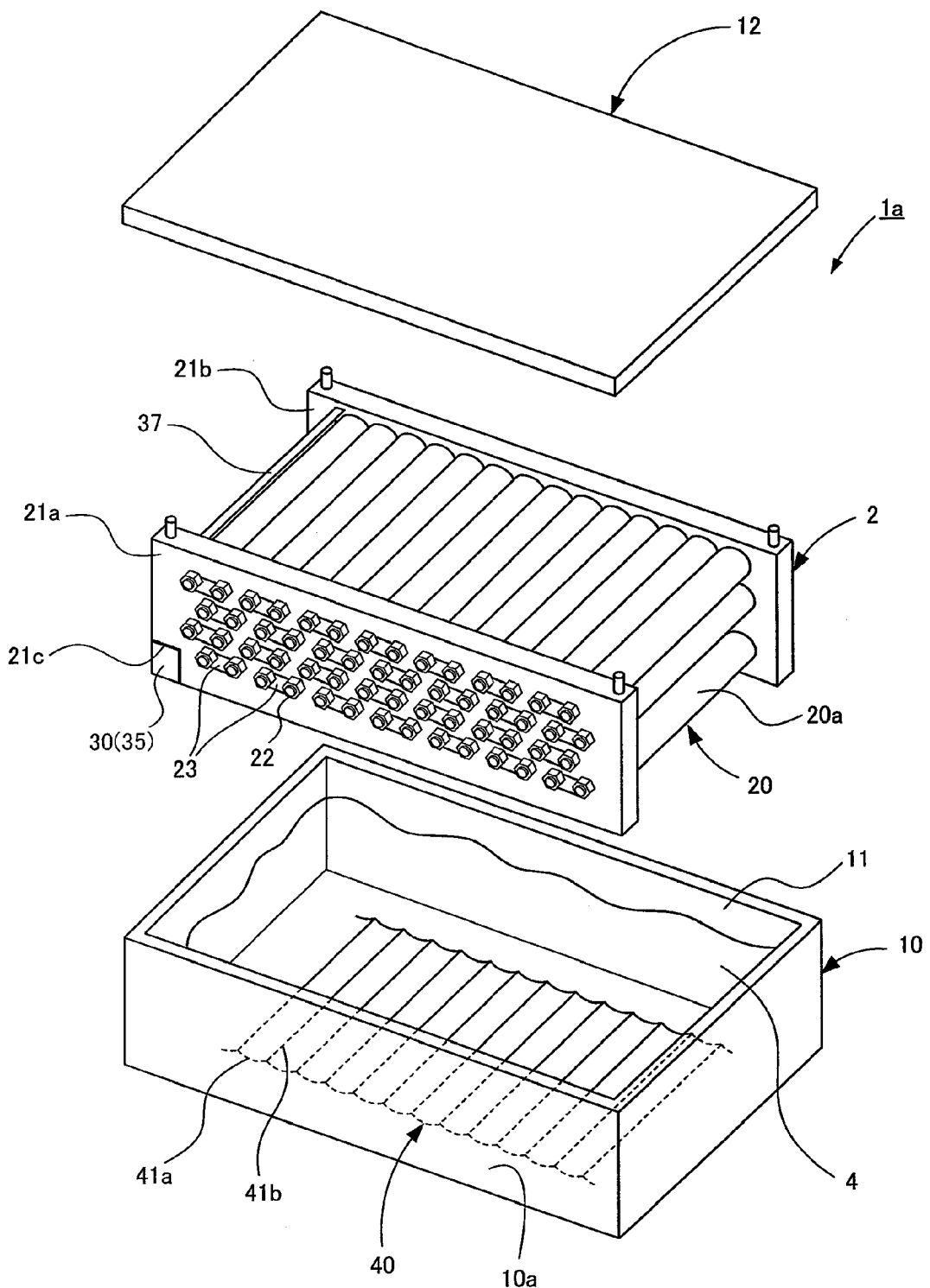
FIG. 9 An exploded perspective view showing a power source apparatus in Embodiment 2 of the present invention.
Figure 10:
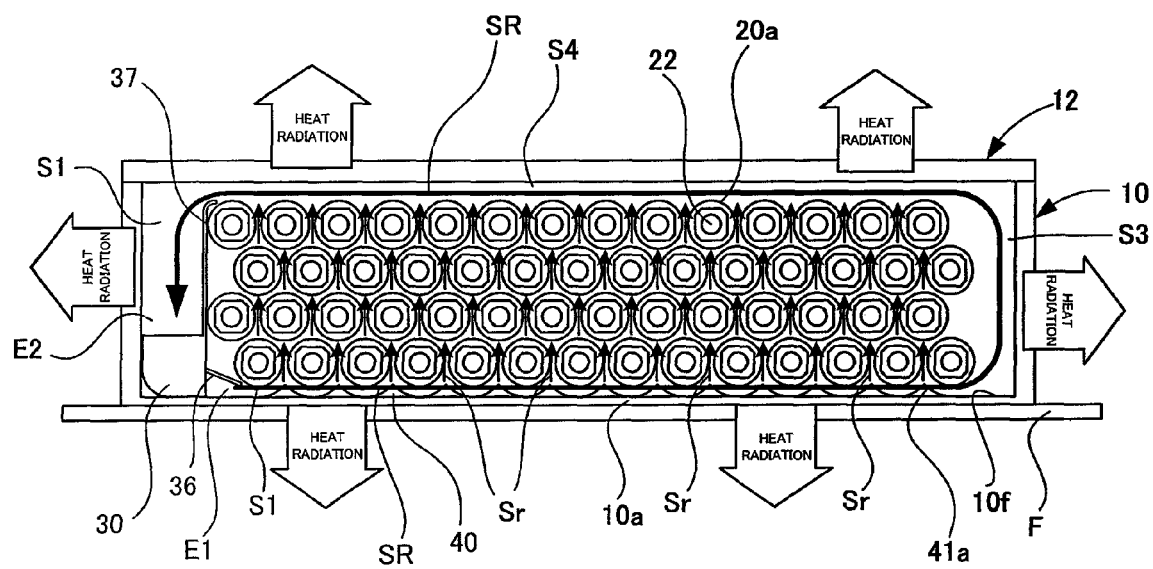
FIG. 10 A section view showing the power source apparatus in Embodiment 2 of the present invention to explain the flow of a cooling liquid.

A power source apparatus in Embodiment 2 of the present invention will be described with reference to FIGS. 9 and 10. FIG. 9 is an exploded perspective view showing a power source apparatus 1*a* of Embodiment 2. FIG. 10 is a section view showing the power source apparatus 1*a* in Embodiment 2 of the present invention to explain the flow of a cooling liquid.

In Embodiment 2, a flow directing portion 40 is provided at a bottom portion of a lower case 10 forming part of a case member as described in Embodiment 1 to direct at least part of a laminar flow of a cooling liquid 4, that is, a branch laminar flow Sr as described in Embodiment 1 between cells 20*a*. Other structures are identical to those in Embodiment 1, so that they are designated with the same reference numerals as in Embodiment 1 and description thereof is omitted.

As shown in FIG. 9, the flow directing portion 40 has a plurality of protruding portions 41a which protrude in a direction substantially perpendicular to a direction in which a main laminar flow SR flows (direction in which the cells 20a arranged in parallel are placed) from a bottom portion 10a of the lower case 10. Each of peaks 41b of the protruding portions 41a is placed in each interval D between the cells 20a. As shown in FIG. 9, each of the peaks 41a extends in the length direction of the cells 20a (length direction of the interval D) and is formed in a long shape.

As shown in FIG. 10, in Embodiment 2, each of the peaks 41b of the flow directing portions 40 is placed substantially at the center of the interval D between cells 20a placed in the lowermost layer within a battery unit 2 of the plurality of cells 20a arranged in parallel. The main laminar flow SR of the cooling liquid 4 flows out of an outlet side E1 of a cross flow fan 30, contacts on the sides of the protruding portions 41a, and branches off to form the branch laminar flow Sr which is then directed to the interval D between the cells 20a placed in the lowermost layer within the battery unit 2.

In this manner, the flow directing portion 40 of Embodiment 2 serves as a guide member for branching part of the laminar flow SR flowing out of the cross flow fan 30 and flowing through space S1 between the bottom portion 10a of the lower case 10 and the cells 20a placed in the lowermost layer within the battery unit 2 of the plurality of cells 20a arranged in parallel and then directing the branch flow to the interval D between the cells 20a placed in the lowermost layer within the battery unit 2.

Thus, more branch laminar flow Sr having the uniform flow velocity in the length direction of the cells 20a is in contact with the cells 20a than in Embodiment 1, which promotes uniform heat exchange in the length direction by the branch laminar flow Sr. This can preferably prevent variations in temperature of the cooling liquid 4 in the length direction of the cells 20a.

The flow directing portion 40 of Embodiment 2 may be provided at a position other than the bottom portion 10a of the lower case 10. For example, the flow directing portion 40 may be provided in the inner surface of an upper case 12, that is, in space S4 between the upper case 12 and the cells 20a placed in the uppermost layer within the battery unit 2 of the plurality of cells 20 arranged in parallel such that the cooling liquid 4 flowing toward the upper case 12 from the interval D between the cells 20a placed in the uppermost layer is guided toward an inlet side E2 of the cross flow fan 30.

Figure 11:
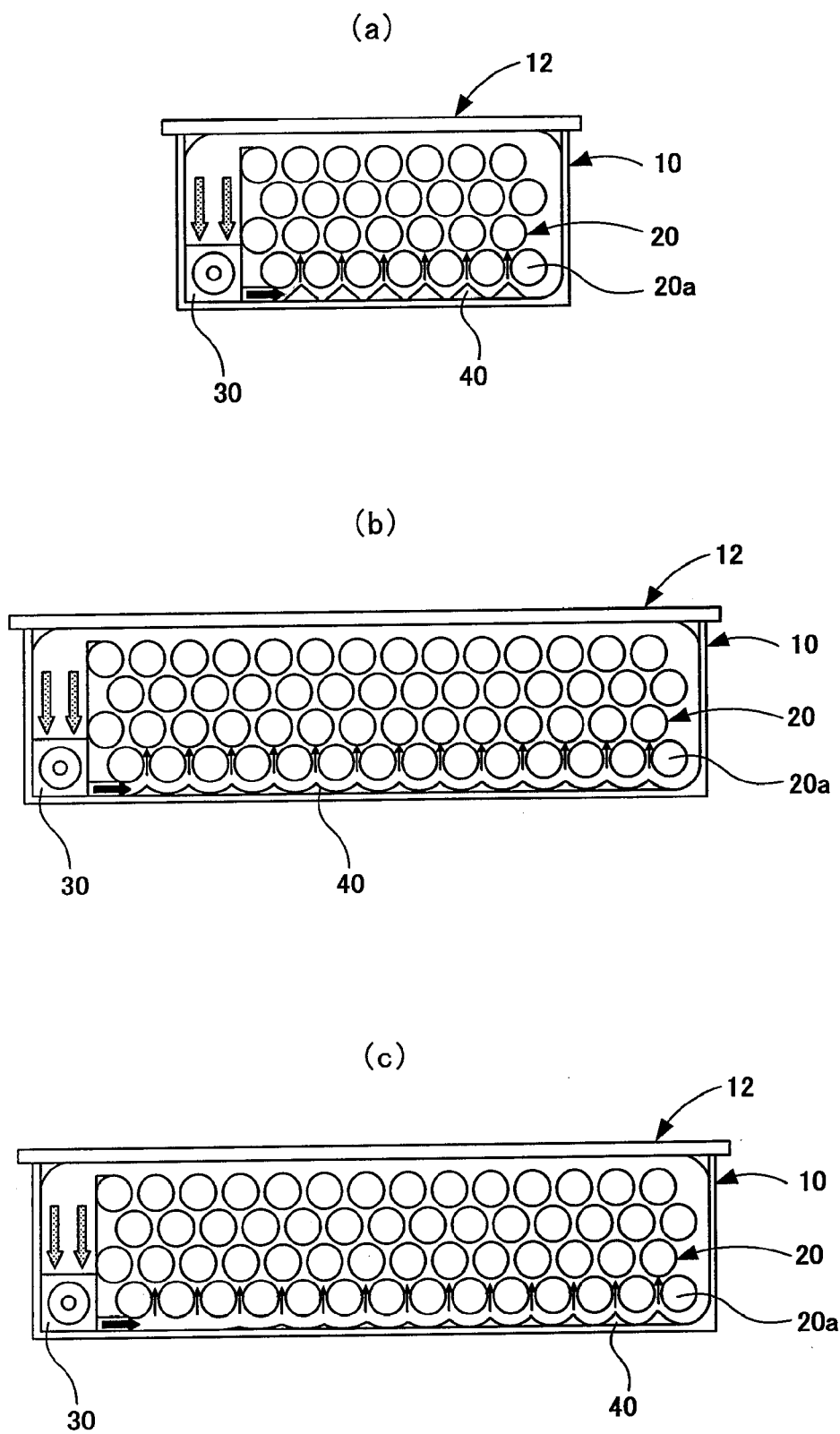
FIGS. 11($a$) to 11($c$) Diagrams for showing modifications in Embodiment 2 of the present invention.

FIGS. 11(a) to 11(c) show modifications of the flow directing portion 40 of Embodiment 2 and are section views showing a power source apparatus 1. In the modifications, the height of protruding portions 41a of a flow directing portion 40 is changed depending on the number of a plurality of cells 20a arranged in parallel in a direction in which a laminar flow SR flows.

FIG. 11(a) shows the case where a flow directing portion 40 is provided for a battery unit 2 which includes seven columns of cells 20a forming an assembled battery 20. FIG. 11(b) shows the case where a flow directing portion 40 is provided for a battery unit 2 which includes fourteen columns of cells 20a forming an assembled battery 20.

In FIG. 11(a), the number of arranged cells 20a is smaller than that in FIG. 11(b), so that a main laminar flow SR formed by a cross flow fan 30 flows over a shorter distance. For this reason, the protruding portions 41a of the flow directing portion 40 are formed to have the height at a level higher than that of the flow directing portion 40 shown in FIG. 10 to promote the flow of a cooling liquid 4 to an interval D between the cells 20a. Since the short outer periphery of the battery unit 2 allows a smooth flow of the main laminar flow SR even with the high protrusions, variations in temperature within the assembled battery 20 can be prevented without producing stagnation of the main laminar flow SR.

On the other hand, the number of cells 20a is larger in FIG. 11(b), so that a main laminar flow SR formed by a cross flow fan 30 flows over a longer distance. Thus, the protruding portions 41a of the flow directing portion 40 are formed to have the height (height of peaks 41b) at a level lower than that in FIG. 11(a) to preclude the flow directing portion 40 from interfering with the flow of the main laminar flow SR. This can flow part of a cooling liquid 4 to an interval between the cells 20a without preventing the flow of the main laminar flow SR.

In FIG. 11(c), the protruding portions 41a of the flow direction portion 40 are formed to have peaks 41b at levels which are raised gradually in the direction in which cells 20 are arranged. Since a main laminar flow SR flows out of a cross flow fan 30 and the flow velocity of the flow SR is reduced as the flow SR moves along in a lower case 10, the peaks 41b are formed to be present at the levels raised in proportion to the distance of the flow of the main laminar flow SR in the arrangement direction of the cells 20a, thereby promoting the flow of the cooling liquid 4 to the interval D between the cells 20a at areas where the flow velocity is lower.

The invention claimed is:

1. A power source apparatus comprising:
   a power source module which includes a plurality of cylindrical power source elements each having a length direction, the plurality of cylindrical power source elements are arranged in parallel, and the plurality of cylindrical power source elements are arranged in parallel in a direction perpendicular to a length direction of the power source module;
   a case which houses the power source module and a cooling liquid; and
   a cross flow fan which is placed in the case in a state in which the cross flow fan is immersed in the cooling liquid together with the power source module,
   wherein the cross flow fan includes a rotation axis which is arranged in parallel to the length direction of the cylindrical power source elements and at least one blade that rotates about the rotation axis, the blade having a width at least substantially the same as a length of the cylindrical power source elements and extending in an axial direction of the rotation axis, and
   an outlet of a laminar flow of the cooling liquid, which is formed by rotating the blade, and flows out of the cross flow fan, is located in a space between the power source module and the case and faces toward the direction arranged in parallel to the plurality of cylindrical power source elements, the laminar flow having a width at least substantially the same as the length of the cylindrical power source elements.

2. The power source apparatus according to claim 1, wherein the power source module includes a pair of end plates which supports both terminals of each of the cylindrical power source elements, and
   wherein the cross flow fan is provided between the end plates and ends of the rotation axis are placed in each the pair of end plates.

3. The power source apparatus according to claim 1, wherein the power source module is placed such that a distance from an inner wall of the case to the power source module is larger than a distance between the adjacent ones of the cylindrical power source elements arranged in parallel.

4. The power source apparatus according to claim 1, wherein the case is provided with a flow directing portion for directing at least part of the laminar flow of the cooling liquid, which flows out from the outlet to the space between the power source module and the case, between the cylindrical power source elements.

5. The power source apparatus according to claim 4, wherein the flow directing portion is formed to have a protruding shape which protrudes in a direction substantially perpendicular to the power source module from the inner wall of the case, and a peak of the protruding shape is placed between the cylindrical power source elements and is formed to have a long shape extending in the length direction of the cylindrical power source element.

6. The power source apparatus according to claim 5, wherein a height of the protruding shape in the flow directing portion is changed depending on the number of the cylindrical power source elements arranged in parallel.

7. The power source apparatus according to claim 1, further comprising a first plate member for directing the cooling liquid flowing out of the outlet of the cross flow fan to space between the power source module and the case, and a second plate member for directing the cooling liquid flow around the power source module to an inlet side of the cross flow fan.

8. The power source apparatus according to claim 1, wherein at least a part of the first place member is located in the space between the power source module and the case and the first place member protrudes in the direction arranged in parallel the plurality of cylindrical power source elements, the second plate member is formed to extend in the direction perpendicular to a flow direction of the cooling liquid which flowing out the outlet.

9. The power source apparatus according to claim 1, wherein the blade has the width at least substantially the same as the length of the cylindrical power source element and forms the laminar flow having all over the width, uniform distribution of the same flow velocity in the length direction of the cylindrical power source element all over the width.

10. The power source apparatus according to claim 1, wherein the outlet face is formed to a shape having the width at least substantially the same as the length of the cylindrical power source element and a length direction of the shape is parallel to the length direction of the cylindrical power source element, the outlet is substantially perpendicular to the direction arranged in parallel the plurality of cylindrical power source elements.

11. The power source apparatus according to claim 1, wherein the power source module includes a plurality of layers that one layer have the plurality of cylindrical power source elements are arranged in parallel.

12. The power source apparatus according to claim 1, wherein the laminar flow flowed out the outlet of the cross flow fan includes a first flow which flows around the power source module, and a second flow branches from the first flow and flows between the cylindrical power source elements arranged in parallel in the direction perpendicular to the length direction.

* * * * *

UNITED STATES PATENT AND TRADEMARK OFFICE
CERTIFICATE OF CORRECTION

PATENT NO.         : 7,974,095 B2                                   Page 1 of 1
APPLICATION NO.    : 12/514340
DATED              : July 5, 2011
INVENTOR(S)        : Takashi Murata It is certified that error appears in the above-identified patent and that said Letters Patent is hereby corrected as shown below:

| Column | Line | |
|--------|------|---|
| 6 | 54 | Change "crow flow" to --cross flow--. |
| 7 | 55 | Change "space 51" to --space S1--. |
| 8 | 26 | Change "potions 33" to --portions 33--. |
| 12 | 63 | After "each" insert --of--. |
| 13 | 31 | After "parallel" insert --to--. |
| 14 | 3 | Before "flowing" insert --is--; after "out" insert --of--. |
| 14 | 7 | After "having" delete "all over the width,". |
| 14 | 17 | After "parallel" insert --with--. |
| 14 | 21 | After "layers" delete "that one layer have" and insert --wherein each layer has--. |
| 14 | 24 | After "flow" change "flowed" to --flowing--; after "out" insert --of--. |

Signed and Sealed this
Twenty-fourth Day of January, 2012

David J. Kappos
*Director of the United States Patent and Trademark Office*